US011282535B2

(12) United States Patent
Choo et al.

(10) Patent No.: US 11,282,535 B2
(45) Date of Patent: Mar. 22, 2022

(54) ELECTRONIC DEVICE AND A CONTROLLING METHOD THEREOF

(71) Applicant: SAMSUNG ELECTRONICS CO., LTD., Suwon-si (KR)

(72) Inventors: Ki-Hyun Choo, Seoul (KR); Anton Porov, Saint-Petersburg (RU); Jong-Hoon Jeong, Hwaseong-si (KR); Ho-Sang Sung, Seoul (KR); Eun-Mi Oh, Seoul (KR); Jong-Youb Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/757,070

(22) PCT Filed: Jul. 19, 2018

(86) PCT No.: PCT/KR2018/008149
§ 371 (c)(1),
(2) Date: Jul. 13, 2020

(87) PCT Pub. No.: WO2019/083130
PCT Pub. Date: May 2, 2019

(65) Prior Publication Data
US 2020/0342893 A1 Oct. 29, 2020

Related U.S. Application Data

(60) Provisional application No. 62/576,887, filed on Oct. 25, 2017.

(51) Int. Cl.
*G10L 15/25* (2013.01)
*G10L 25/30* (2013.01)
*G10L 21/02* (2013.01)

(52) U.S. Cl.
CPC .............. *G10L 25/30* (2013.01); *G10L 21/02* (2013.01)

(58) Field of Classification Search
CPC ................................ G10L 25/30; G10L 21/02
(Continued)

(56) References Cited

U.S. PATENT DOCUMENTS 7,593,535 B2 9/2009 Shmunk
8,229,129 B2 7/2012 Jeong et al.
(Continued)

FOREIGN PATENT DOCUMENTS

KR 10-2009-0037692 4/2009
KR 10-2009-0038480 4/2009
(Continued)

OTHER PUBLICATIONS

J. Schliiterand S. Bock, "Improved musical onset detection with Convolutional Neural Networks," 2014 IEEE International Conference on Acoustics, Speech and Signal Processing (ICASSP), 2014, pp. 6979-6983, doi: 10.1109/ICASSP.2014.6854953. (Year: 2014) (Year: 2014).*
(Continued)

*Primary Examiner* — Bharatkumar S Shah
(74) *Attorney, Agent, or Firm* — Nixon & Vanderhye, P.C.

(57) ABSTRACT

Disclosed is an electronic apparatus. The electronic apparatus includes a storage for storing a plurality of filters trained in a plurality of convolutional neural networks (CNNs) respectively and a processor configured to acquire a first spectrogram corresponding to a damaged audio signal,
(Continued)

input the first spectrogram to a CNN corresponding to each frequency band to apply the plurality of filters trained in the plurality of CNNs respectively, acquire a second spectrogram by merging output values of the CNNs to which the plurality of filters are applied, and acquire an audio signal reconstructed based on the second spectrogram.

15 Claims, 9 Drawing Sheets

(58) Field of Classification Search
USPC .......................................................... 704/232
See application file for complete search history.

(56) References Cited

U.S. PATENT DOCUMENTS

| | | | |
|---|---|---|---|
| 8,582,785 B2 | 11/2013 | Moon | |
| 9,037,458 B2 | 5/2015 | Park et al. | |
| 9,135,920 B2 | 9/2015 | Soulodre | |
| 9,305,556 B2 | 4/2016 | Kim et al. | |
| 2004/0057586 A1 | 3/2004 | Licht | |
| 2008/0189118 A1 | 8/2008 | Lee et al. | |
| 2012/0166190 A1 | 6/2012 | Lee et al. | |
| 2015/0066499 A1 | 3/2015 | Wang et al. | |
| 2015/0162014 A1 | 6/2015 | Zhang et al. | |
| 2016/0322055 A1* | 11/2016 | Sainath | H04R 3/005 |
| 2017/0140260 A1* | 5/2017 | Manning | G06N 3/02 |
| 2017/0194019 A1 | 7/2017 | Derrick et al. | |
| 2017/0345433 A1* | 11/2017 | Dittmar | G10L 21/0272 |
| 2018/0108187 A1* | 4/2018 | Kosubek | G01N 29/14 |

FOREIGN PATENT DOCUMENTS

| | | |
|---|---|---|
| KR | 10-2012-0072243 | 7/2012 |
| KR | 10-1377135 | 3/2014 |
| KR | 10-2016-0120730 | 10/2016 |

OTHER PUBLICATIONS

S. Dieleman and B. Schrauwen, "End-to-end learning for music audio," 2014 IEEE International Conference on Acoustics, Speech and Signal Processing (ICASSP), 2014, pp. 6964-6968, doi: 10.1109/ICASSP.2014.6854950. (Year: 2014).*
J. Schluter and S. Bock, "Improved musical onset detection with Convolutional Neural Networks," 2014 IEEE International Conference on Acoustics, Speech and Signal Processing (ICASSP), 2014, pp. 6979-6983, doi: 10.1109/ICASSP.2014.6854953. (Year: 2014).*
Extended European Search Report dated Sep. 18, 2020 in counterpart European Patent Application No. 18870750.9.
Park, Se Rim et al., "A Fully Convolutional Neural Network for Speech Enhancement," arxiv. org, Sep. 22, 2016, XP 080813105 (6 pages).
Porov, Anton et al., "Music Enhancement by a Novel CNN Architecture," AES Convention 145; Oct. 7, 2018, XP 340699106, pp. 1-8.
International Search Report for PCT/KR2018/008149 dated Nov. 20, 2018, 2 pages.
Written Opinion of the ISA for PCT/KR2018/008149 dated Nov. 20, 2018, 9 pages.
Dong et al., "Image Super-Resolution Using Deep Convolutional Networks", IEEE, Jul. 31, 2015, 14 pages.
Kuleshov et al., "Audio Super-Resolution Using Neural Nets", Workshop track—ICLR 2017, Aug. 2, 2017, 8 pages.
Communication pursuant to Article 94(3) EPC dated Jul. 2, 2021 in counterpart European Patent Application No. 18870750.9.

* cited by examiner

ELECTRONIC DEVICE AND A CONTROLLING METHOD THEREOF

This application is the U.S. national phase of International Application No. PCT/KR2018/008149 filed Jul. 19, 2018 which designated the U.S. and claims priority to U.S. Provisional Application No. 62/576,887 filed Oct. 25, 2017, the entire contents of each of which are hereby incorporated by reference.

BACKGROUND

1. Field

This disclosure relates to an electronic apparatus and a controlling method thereof and, more particularly, to an electronic apparatus capable of reconstructing sound quality of audio and a controlling method thereof.

2. Description of Related Art

An artificial intelligence (AI) system is a computer system that implements a human-level intelligence and a system in which a machine learns, judges, and becomes smart, unlike an existing rule-based smart system. As the use of AI systems improves, a recognition rate and understanding or anticipation of a user's taste may be performed more accurately. As such, existing rule-based smart systems are gradually being replaced by deep learning-based AI systems.

AI technology is composed of machine learning (for example, deep learning) and elementary technologies that utilize machine learning.

Machine learning is an algorithm technology that is capable of classifying or learning characteristics of input data. Element technology is a technology that uses machine learning algorithms such as deep learning. Machine learning is composed of technical fields such as linguistic understanding, visual understanding, reasoning, prediction, knowledge representation, motion control, or the like.

Various fields in which AI technology is applied are as shown below. Linguistic understanding is a technology for recognizing, applying, and/or processing human language or characters and includes natural language processing, machine translation, dialogue system, question and answer, voice recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, recommendation, or the like. Knowledge representation is a technology for automating human experience information into knowledge data, including knowledge building (data generation or classification), knowledge management (data utilization), or the like. Motion control is a technique for controlling the autonomous running of the vehicle and the motion of the robot, including motion control (navigation, collision, driving), operation control (behavior control), or the like.

Recently, research has been actively conducted on machine learning, which is an algorithm capable of recognizing objects like humans and understanding information, as big data collection and storage are enabled by development of hardware technology and computer capabilities and techniques for analyzing thereof are becoming more sophisticated and accelerated. In particular, in the machine learning technical field, research on deep learning in an autonomous learning scheme using a neural network has been actively conducted.

The neural network is an algorithm for determining the final output by comparing the activation function to a particular boundary value for the sum which is acquired by multiplying a plurality of inputs by a weight, based on the intent to aggressively mimic the function of the human brain and is generally formed of a plurality of layers. A convolutional neural network (CNN), which is widely used for image recognition, a recurrent neural network (RNN), which is widely used for speech recognition, and the like are representative examples.

The disclosure provides a method for learning audio data using a neural network and reconstructing damaged audio data. When an audio signal is compressed or transmitted, an audio signal of some frequency band may be lost for efficient compression or transmission. The audio signal from which data in some frequency band is lost may have degraded sound quality or changed tone as compared to the audio signal before being lost.

An automobile is a representative location where music is consumed primarily, but due to the expanded use of the compressed/degraded sound source, a user cannot help listening to music with generally degraded sound quality.

Accordingly, if the audio signal including the lost frequency band is to be reproduced to be close to the original sound with a high sound quality, it is required to effectively reconstruct the audio signal in the lost frequency band.

SUMMARY

The disclosure provides an electronic apparatus in which an effective reconstruction is performed so that a user may enjoy a high quality sound even in a compressed or degraded sound source and a method for controlling thereof.

An electronic apparatus according to an embodiment includes a storage for storing a plurality of filters trained in a plurality of convolutional neural networks (CNNs) respectively and a processor configured to acquire a first spectrogram corresponding to a damaged audio signal, input the first spectrogram to a CNN corresponding to each frequency band to apply the plurality of filters trained in the plurality of CNNs respectively, acquire a second spectrogram by merging output values of the CNNs to which the plurality of filters are applied, and acquire an audio signal reconstructed based on the second spectrogram.

The plurality of CNNs include a first CNN into which a first spectrogram of a first frequency band is input and a second CNN into which a first spectrogram of a second frequency band is input, the plurality of filters include a first filter and a second filter trained in the first CNN and a third filter and a fourth filter trained in the second CNN, the first filter and third filter may be trained based on the first frequency band and the second filter and the fourth filter are trained based on the second frequency band, and the processor is configured to acquire a second spectrogram corresponding to the first frequency band by merging output values of the first CNN to which the first filter is applied and output values of the second CNN to which the third filter is applied, and acquire a second spectrogram corresponding to the second frequency band by merging output values of the first CNN to which the second filter is applied and output values of the second CNN to which the fourth filter is applied.

The processor is configured to identify the first spectrogram in a frame unit, group a current frame and a previous frame in a predetermined number to input the grouped frames to the CNN corresponding to each frequency band, and acquire a reconstructed current frame by merging output values of the CNN respectively.

The plurality of CNNs may be included in a first CNN layer, and the processor is configured to acquire the second spectrogram by inputting an output value of the first CNN layer to a second CNN layer comprising a plurality of other CNNs, and a size of a filter included in the second CNN layer is different from a size of a filter included in the first CNN layer.

The processor is configured to input the first spectrogram by the frequency bands to which the plurality of filters are applied to a sigmoid gate respectively, and acquire the second spectrogram by merging the first spectrogram by frequency bands output from the sigmoid gate.

The electronic apparatus may further include an inputter, and the processor is configured to transform the damaged audio signal input through the inputter to the first spectrogram based on time and frequency, and acquire the reconstructed audio signal by inverse transforming the second spectrogram to an audio signal based on time and magnitude.

The processor is configured to acquire a compensated magnitude component by acquiring a magnitude component in the first spectrogram and inputting to corresponding CNNs by frequency bands and acquire the second spectrogram by combining a phase component of the first spectrogram and the compensated magnitude component.

The processor is configured to input a frequency band which is greater than or equal to a predetermined magnitude, among frequency bands of the first spectrogram, to a corresponding CNN.

The processor is configured to normalize and input the first spectrogram to a corresponding CNN by frequency bands, denormalize the second spectrogram, and acquire the reconstructed audio signal based on the denormalized second spectrogram.

According to an embodiment, a method of controlling an electronic apparatus includes acquiring a first spectrogram corresponding to a damaged audio signal, inputting the first spectrogram to a CNN corresponding to each frequency band, applying a plurality of filters respectively trained in the CNN corresponding to each frequency band to the input first spectrogram, acquiring a second spectrogram by merging output valued of the CNNs to which the plurality of filters are applied, and acquiring an audio signal reconstructed based on the second spectrogram.

The plurality of CNNs may include a first CNN into which a first spectrogram of a first frequency band is input and a second CNN into which a first spectrogram of a second frequency band is input, the plurality of filters may include a first filter and a second filter trained in the first CNN and a third filter and a fourth filter trained in the second CNN, the first filter and third filter are trained based on the first frequency band and the second filter and the fourth filter are trained based on the second frequency band, the acquiring the second spectrogram may include acquiring a second spectrogram corresponding to the first frequency band by merging output valued of the first CNN to which the first filter is applied and output valued of the second CNN to which the third filter is applied, and acquiring a second spectrogram corresponding to the second frequency band by merging output valued of the first CNN to which the second filter is applied and output valued of the second CNN to which the fourth filter is applied.

The inputting may include identifying the first spectrogram in a frame unit, grouping a current frame and a previous frame in a predetermined number to input the grouped frames to the CNN corresponding to each frequency band, and the acquiring the second spectrogram may include acquiring a reconstructed current frame by merging output values of the CNN respectively.

The plurality of CNNs may be included in a first CNN layer, and the acquiring the second spectrogram may include acquiring the second spectrogram by inputting an output value of the first CNN layer to a second CNN layer comprising a plurality of other CNNs, and wherein a size of a filter included in the second CNN layer is different from a size of a filter included in the first CNN layer.

The acquiring the second spectrogram may include inputting first spectrogram by the frequency bands to which the plurality of filters are applied to a sigmoid gate respectively, and acquiring the second spectrogram by merging the first spectrogram by frequency bands output from the sigmoid gate.

The controlling method may include receiving a damaged audio signal, transforming the input audio signal to the first spectrogram based on time and frequency, and acquiring the reconstructed audio signal by inverse-transforming the second spectrogram to an audio signal based on time and magnitude.

The inputting may include acquiring a magnitude component in the first spectrogram and inputting to corresponding CNNs by frequency bands, and the acquiring the second spectrogram may include acquiring the second spectrogram by combining the phase component of the first spectrogram with the magnitude component compensated by the CNN.

The inputting may include inputting a frequency band which is greater than or equal to a predetermined magnitude, among frequency bands of the first spectrogram, to a corresponding CNN.

The method may further include normalizing and inputting the first spectrogram to a corresponding CNN by frequency bands, denormalizing the second spectrogram, and acquiring the reconstructed audio signal based on the denormalized second spectrogram.

A non-transitory computer readable medium having stored therein a computer instruction which is executed by a processor of an electronic apparatus to perform the method includes acquiring a first spectrogram corresponding to a damaged audio signal, inputting the first spectrogram to a convolutional neural network (CNN) corresponding to each frequency band, applying a plurality of filters respectively trained in the CNN corresponding to each frequency band to the input first spectrogram, acquiring a second spectrogram by merging output values of the CNNs to which the plurality of filters are applied, and acquiring an audio signal reconstructed based on the second spectrogram.

According to various embodiments, even a sound source degraded due to compression can enable a user to enjoy sound in a level of an original sound, and radio resource waste due to high bandwidth data transmission can be reduced.

DETAILED DESCRIPTION OF EXAMPLE EMBODIMENTS

Figure 1:
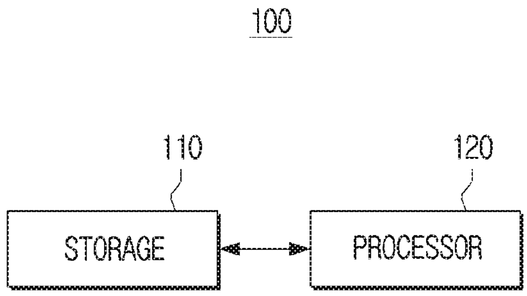
FIG. 1 is a block diagram briefly illustrating a configuration of an electronic apparatus according to an embodiment.

Prior to specifying the embodiment, a drafting method of the disclosure and drawings will be described.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different embodiments. In other words, although elements having the same reference numerals are all illustrated in a plurality of drawings, the plurality of drawings do not mean one embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise," "include," or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

Also, when any part is connected to another part, this includes a direct connection and an indirect connection through another medium. Further, when a certain portion includes a certain element, unless specified to the contrary, this means that another element may be additionally included, rather than precluding another element.

Hereinafter, an embodiment will be described in greater detail referring to attached drawings.

FIG. 1 is a block diagram briefly illustrating a configuration of an electronic apparatus according to an embodiment.

Referring to FIG. 1, an electronic apparatus 100 according to an embodiment includes a storage 110 and a processor 120.

The electronic apparatus 100 may be implemented as an electronic apparatus such as a smartphone, a tablet personal computer (PC), car audio, audio-exclusive player such as MP3 player, a personal digital assistant (PDA), or the like. The electronic apparatus 100 may be implemented as various electronic apparatuses capable of reproducing audio.

The storage 110 may store a plurality of convolutional neural network (CNN) models and a plurality of filters trained in each of the plurality of CNN models.

The CNN model may be designed to simulate human brain structure on computer and may include a plurality of network modes that simulate neurons of human neural network and have a weight. The plurality of network nodes may each establish a connection relation so that the neurons simulate synaptic activity of transmitting and receiving signals through synapses. In the learned CNN model, a plurality of network nodes is located at different depths (or layers) and may exchange data according to a convolution connection relation. For example, learned models may include recurrent neural network (RNN), and bidirectional recurrent deep neural network (BRDNN), in addition to CNN, but are not limited thereto.

The filter is a mask having a weight and is defined as matrix of data and may be referred to as a window or kernel.

For example, a filter may be applied to the input data input to the CNN, and the sum (convolution operation) of values acquired by multiplying the input data by the filters, respectively, may be determined as output data (feature maps). The input data can be extracted into a plurality of data through multiple filters, and a plurality of feature maps can be derived according to the number of filters. Such a convolution operation may be repeated by a plurality of CNNs that form multiple layers.

As described above, by combining multiple filters capable of extracting different features and applying the filters into input data, it is possible to determine which feature the inputted original data includes.

There may be a plurality of CNNs for each layer, and filters trained or learned in each CNN may be stored separately.

The processor 120 is configured to control the overall operation of the electronic apparatus 100. The processor 120 is configured to acquire a spectrogram corresponding to the damaged audio signal and to output the reconstructed audio signal by applying a plurality of filters trained in the plurality of CNNs to the acquired spectrogram.

Figure 2A:
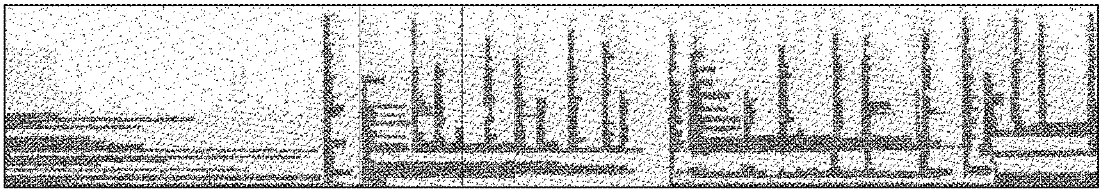
FIGS. 2A and 2B are views illustrating spectrogram of a damaged audio signal according to an embodiment.
Figure 2B:
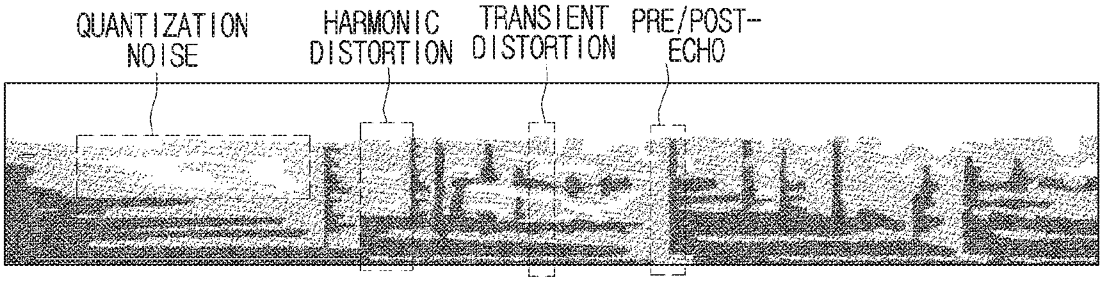

Specifically, the processor 120 acquires a first spectrogram corresponding to the damaged audio signal. As shown in FIGS. 2A and 2B, the processor 120 may transform the waveform of the damaged audio signal to a first spectrogram represented by time and frequency. The first spectrogram represents a change in frequency and amplitude of the damaged audio signal over time.

The processor 120 may perform a transformation of the damaged audio signal based on a modified discrete cosine transform (MDCT) and a modified discrete sine transform (MDST), and may represent the damaged audio signal as spectrogram data using a quadrature mirror filter (QMF).

Figure 3A:
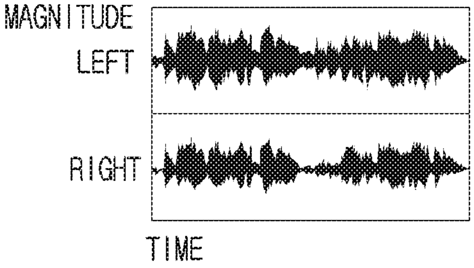
FIGS. 3A and 3B are views are views illustrating a process of converting a damaged audio signal to a spectrogram format according to an embodiment.
Figure 3B:
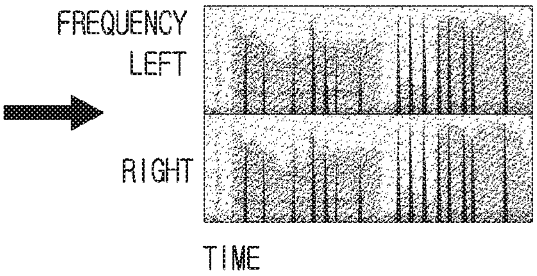

FIGS. 3A and 3B illustrate spectrogram of an audio signal (original sound) before being damaged and spectrogram of the audio signal damaged due to compression, or the like.

As illustrated in FIG. 3B, compressed audio includes signal distortion due to compression, such as pre-echo (forward echo) and post echo, transient distortion, harmonic distortion, quantization noise, and the like. In particular, these signals are frequently generated in the high frequency region.

The processor 120 inputs the first spectrogram to corresponding CNNs for each frequency band. However, in consideration of the features of the CNNs and the audio signal, the processor 120 may extract an amplitude component and a phase component from the first spectrogram, and input only the extracted amplitude component to the corresponding CNNs for each frequency band. That is, the reconstruction of the damaged audio signal is made with respect to amplitude, and the phase of the damaged audio signal can be used as it is.

The processor 120 may perform reconstructing for amplitude component of compressed audio using CNN (frequency-time dependent CNN (FTD-CNN)) based on frequency and time.

Figure 4:
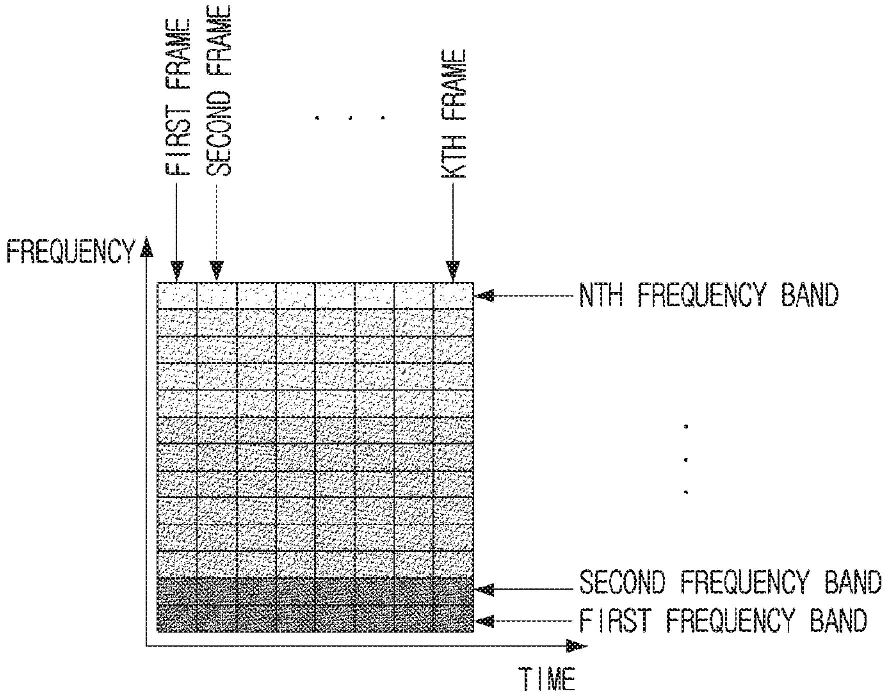
FIG. 4 is a view illustrating dividing a spectrogram of a damaged audio signal by data of each frequency band according to an embodiment.

FIG. 4 is a view illustrating dividing a spectrogram of a damaged audio signal by data for each frequency band according to an embodiment.

The processor 120 may divide the first spectrogram of a predetermined time zone by frequency bands (first frequency band to $N^{th}$ frequency band), identify the first spectrogram in a frame unit of a predetermined time interval, and divide the first spectrogram into a first frame to a $K^{th}$ frame by frame units. That is, the first to $K^{th}$ frames are grouped in units input to the CNN, and one group can form K time slots. Here, the $K^{th}$ frame of the first spectrogram corresponds to the current frame to be reconstructed.

The processor 120 may perform reconstruction on the amplitude component of the entire frequency band of the first spectrogram, or may input only the data corresponding to the frequency band (high frequency band) above a predetermined magnitude among the frequency bands of the first spectrogram to the CNN, and maintain the data corresponding to the frequency band (low frequency band) below the predetermined magnitude without reconstructing.

The processor 120 may apply a plurality of filters stored in the storage 110 relative to the first spectrogram input to each CNN for each frequency band and acquire the second spectrogram by merging output values of each CNN to which a plurality of filters are applied.

The processor 120 acquires the reconstructed audio signal based on the second spectrogram acquired as shown above.

Figure 5:
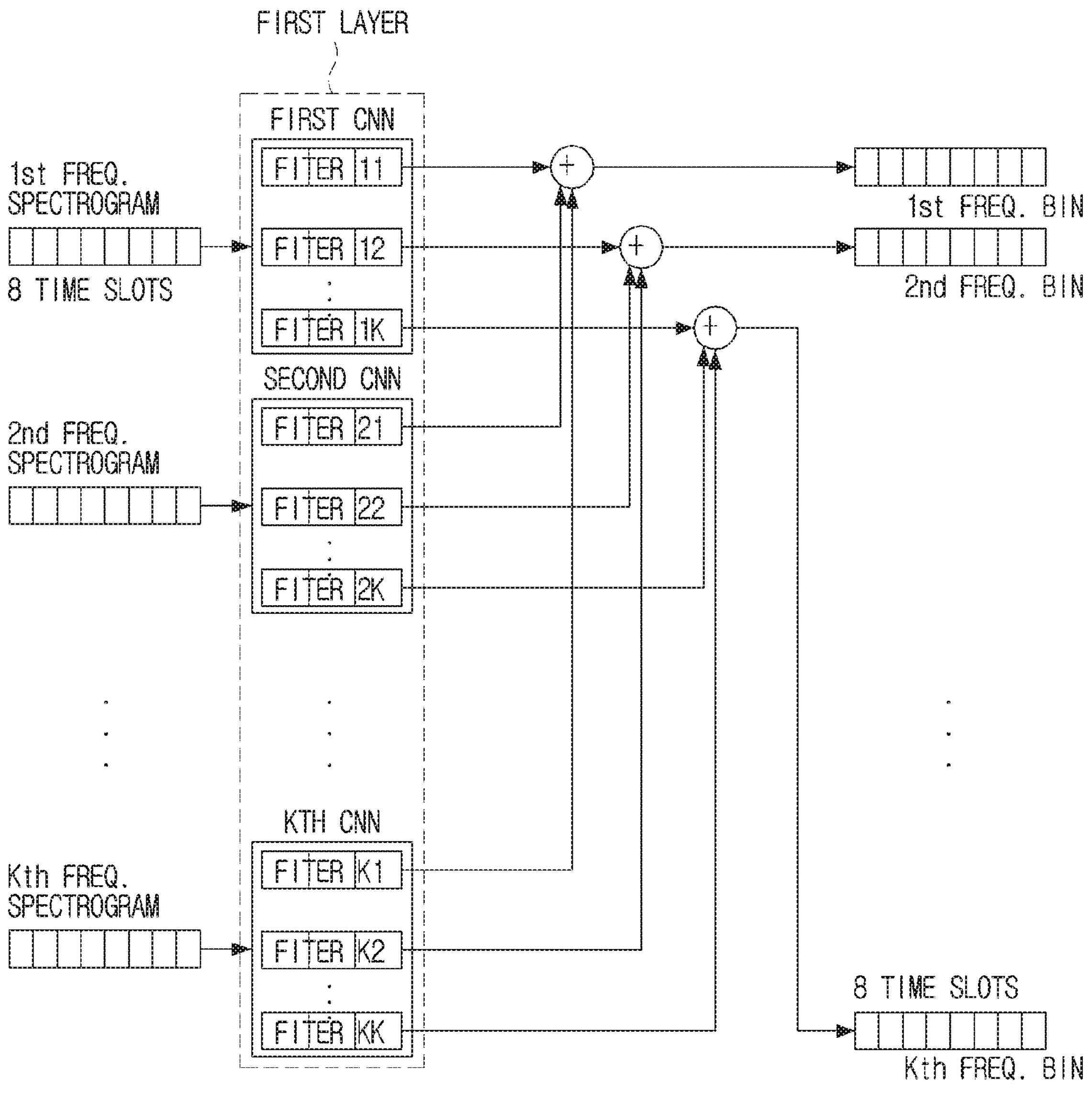
FIG. 5 is a view illustrating a method for reconstructing a damaged audio signal using CNN according to an embodiment.

FIG. 5 is a view illustrating a method for reconstructing a damaged audio signal using CNN according to an embodiment.

As illustrated in FIG. 5, data corresponding to the spectrogram of the first frequency band to the $K^{th}$ frequency band, among the divided frequency bands, may be input to each of the first CNN to the $K^{th}$ CNN forming the first layer, respectively.

That is, the spectrogram of the first frequency band is input to the first CNN and is filtered by the pre-trained filters 11 to 1K corresponding to the first CNN. Similarly, the spectrogram of the second frequency band is input to the second CNN and is filtered by the pre-trained filters 21 to 2K corresponding to the second CNN. By this process, the spectrogram of the $K^{th}$ frequency band is input to the $K^{th}$ CNN and is filtered by the pre-trained filters K0 to KK corresponding to the $K^{th}$ CNN.

As described above, in each CNN, the number of filters corresponding to the number (K) of the divided frequency bands is applied to the spectrograms of each frequency band. Here, filters 11, 21 to K1 of each CNN are filters trained based on the first frequency band, and filters 12, 22 to K2 are filters trained based on the second frequency band. Similarly, the filters 1K, 2K to KK of each CNN refer to filters trained based on the $K^{th}$ frequency band. In addition, each filter has the same size.

Learning of the filter may be performed based on the results for the entire band. For example, the filter value may be determined by combining the spectrogram of the first frequency band generated by adding the result of 11, 21 . . . , and K1, and the result of combining the spectrogram of the $K^{th}$ frequency band generated by adding the result of 1K, 2K, and KK. If the filter value is determined in this manner, the adjacent spectrum may be considered on the time axis, and the signal generation may be performed in consideration of the entire frequency band. Therefore, according to an embodiment, a local time relationship may be processed in consideration of a global frequency relationship.

Although omitted in the drawings, the filtering process may be performed through a plurality of layers, such as a second layer and a third layer in the same manner as the first layer. That is, by stacking a plurality of layers to configure the final network, each of the pre-defined filters may be trained in a direction that minimizes the error between the desired target spectrum and the processed spectrum based on the result of the entire layer.

The processor 120 may acquire the second spectrogram corresponding to the first frequency band by merging output values in which the spectrogram of the first to $K^{th}$ frequency bands in each CNN are filtered by filters 11 to K1 that are trained based on the first frequency band.

Similarly, the processor 120 may acquire the second spectrogram corresponding to the second frequency band by merging the output values in which the spectrogram of the first to $K^{th}$ frequency bands in each CNN is filtered by filters 12 to K2 trained by the second frequency band.

The processor 120 may acquire the second spectrogram corresponding to the $K^{th}$ frequency band by merging the output values in which the spectrogram of the first to $K^{th}$ frequency bands in each CNN is filtered based on filters 1K to KK that are trained based on the $K^{th}$ frequency band.

The processor 120 may acquire the second spectrogram corresponding to the entire frequency band accordingly.

According to an embodiment, by performing padding for the first spectrogram, the second spectrogram may have the same magnitude as the first spectrogram.

As the padding operation is omitted, the second spectrogram may have a smaller magnitude than the first spectrogram. For example, if the magnitude of the first spectrogram is 8, that is, when the first spectrogram consists of eight frames, if the size of the filter is 2, the magnitude of the second spectrogram becomes "7." If padding is applied, the magnitude of the second spectrogram is maintained to be "8."

Figure 6:
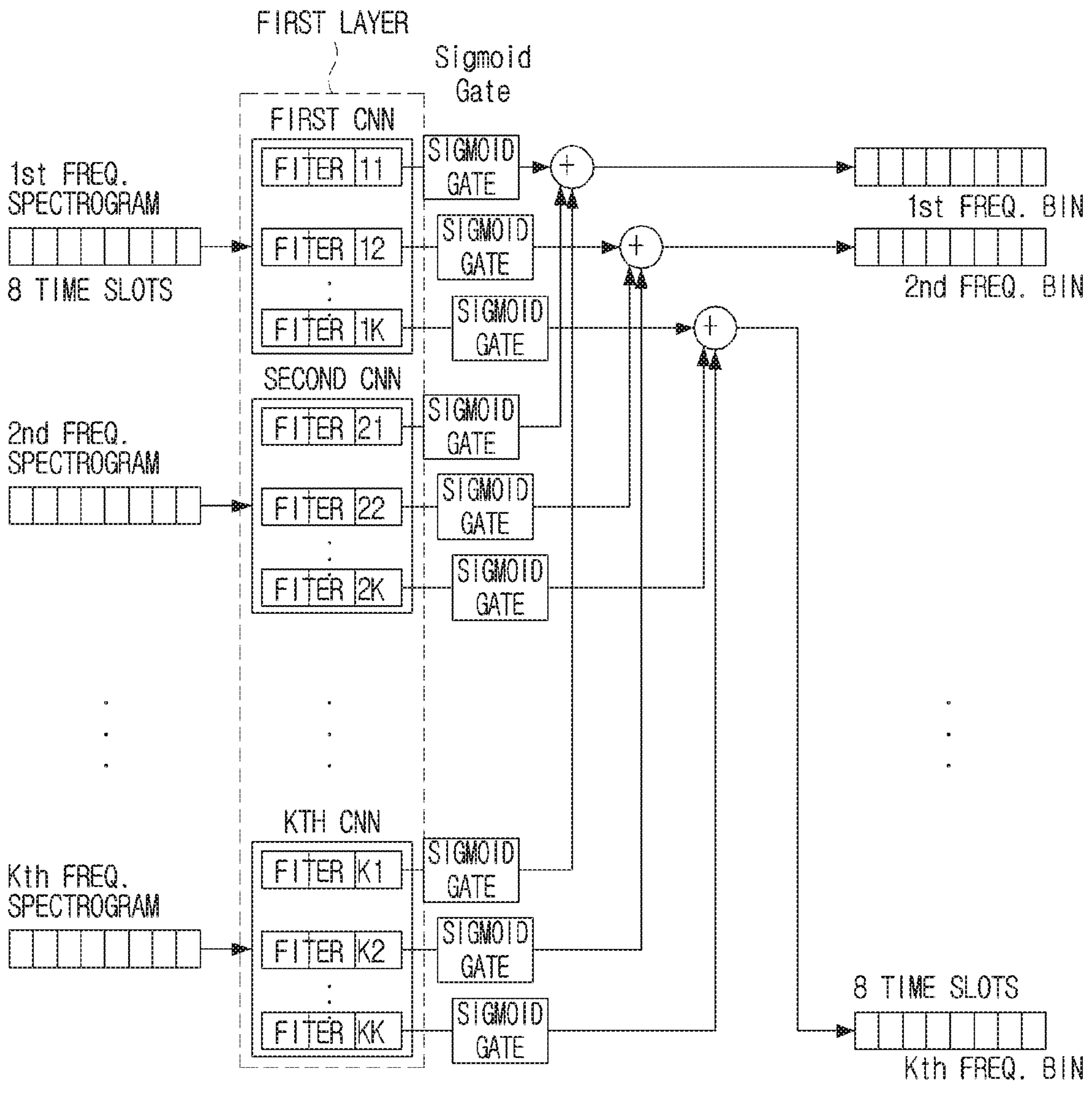
FIGS. 6 and 7 are views illustrating a method for reconstructing a damaged audio using CNN according to another embodiment.

As illustrated in FIG. 6, a sigmoid function may be applied to the result value output from each layer of the plurality of CNNs or the result value (feature map) output from the final layer. For this purpose, as illustrated in FIG. 6, a sigmoid gate to which an output value filtered by each filter is input to the end of each CNN in each layer or final layer can be additionally included. The sigmoid gate may be disposed at each terminal through which an output value by a filter applied at each CNN of a plurality of layers is output.

Figure 7:
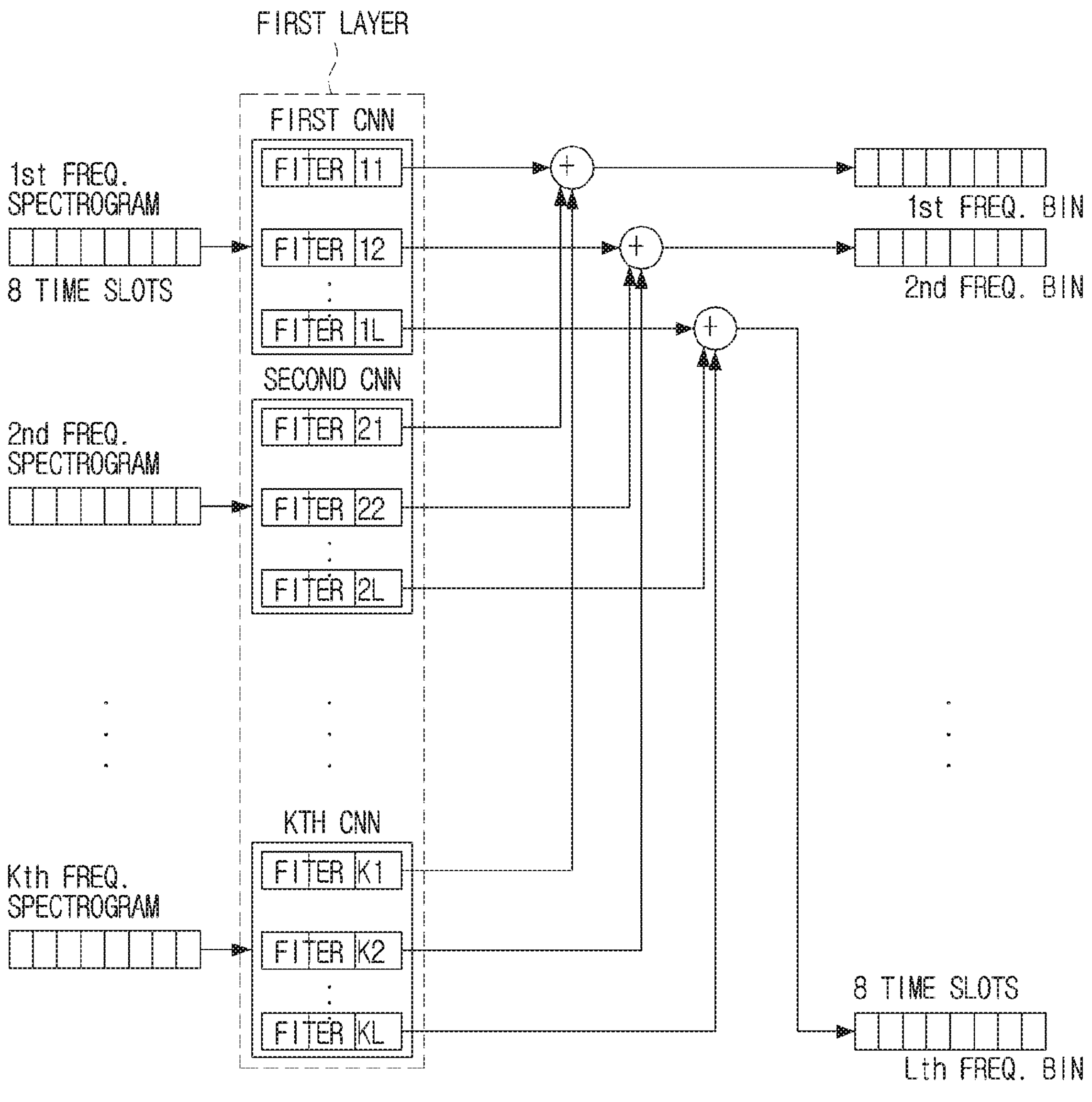

According to another embodiment of FIG. 7, L number of filters may be applied to the spectrogram of each frequency band, instead of the K number of frequency bands divided in each CNN. In this case, the output second spectrogram may be data in which frequency is extended to the L frequency band.

Figure 8:
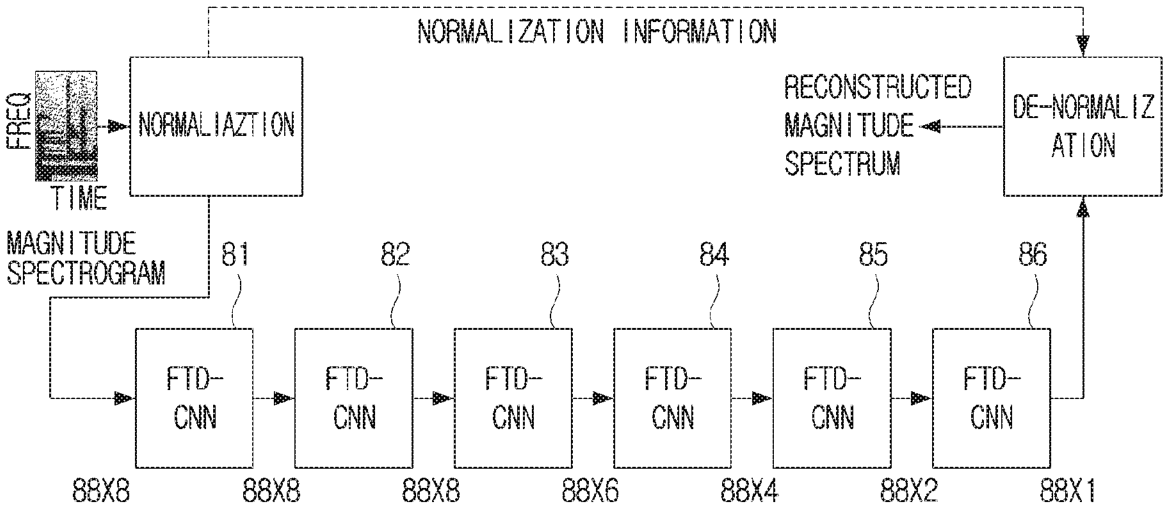
FIG. 8 is a view illustrating a method for designing CNN for reconstructing a damaged audio signal according to an embodiment.

FIG. 8 is a view illustrating a method for designing CNN for reconstructing a damaged audio signal according to an embodiment.

As shown in FIG. 8, the processor 120 performs normalization on the spectrogram (first spectrogram) of the damaged audio signal, and extracts the amplitude component in the first spectrogram for which normalization is performed. The processor 120 may enter input data corresponding to an amplitude component of the extracted first spectrogram into a plurality of CNN layers comprised of at least one CNN.

According to FIG. 8, the input data may pass through a plurality of CNN layers. A first layer 81 and a second layer 82 of the plurality of CNN layers maintain the magnitude of the input data by padding, and a third layer 83 may reduce the magnitude of the input data passing through the second layer 82 to 6. The fourth layer 84 may reduce the size of the input data passing through the third layer 83 to 4. The fifth layer 85 may reduce the size of the input data passing through the fourth layer 84 to 2, and the sixth layer 86 may reduce the size of the input data passing through the fifth layer 85 to 1.

That is, the sizes of the filter that are applied to input data by a plurality of CNN layers are different from each other, and a plurality of CNN layers may be disposed to make output data having the size of 1 be finally outputted.

The processor 120 may perform de-normalization of the output data passing through the plurality of CNN layers to acquire reconstructed data of the input data corresponding to the amplitude component. The processor 120 may perform de-normalization with respect to the output data using the stored normalization information when normalization is performed on the input data.

Figure 9:
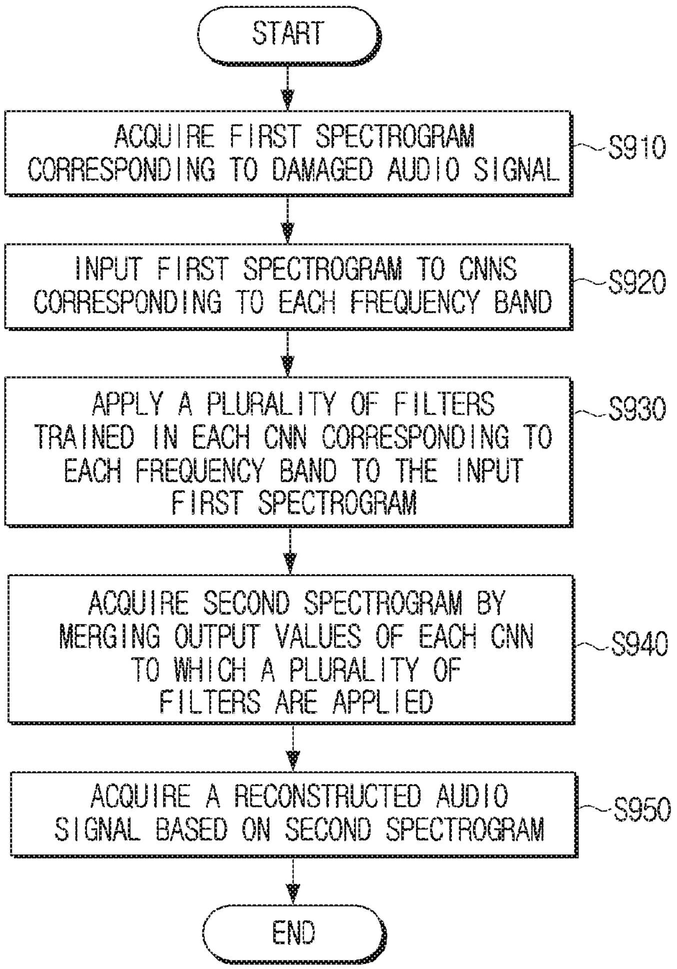
FIG. 9 is a flowchart to describe a method for controlling an electronic apparatus according to an embodiment.

FIG. 9 is a flowchart to describe a method for controlling an electronic apparatus according to an embodiment.

A first spectrogram corresponding to a damaged audio signal is acquired in operation S910. The damaged audio signal may be input, and the input audio signal may be transformed to a first spectrogram based on time and frequency.

Thereafter, the first spectrogram is input to the corresponding CNN for each frequency band in operation S920. The first spectrogram is identified in a frame unit, and a current frame and a predetermined number of previous frames are grouped and input into a corresponding CNN for each frequency band. In addition, a magnitude component may be acquired in the first spectrogram and input to a corresponding CNN for each frequency band. A frequency band that is greater than or equal to a predetermined magnitude among the frequency bands of the first spectrogram may be input to the corresponding CNN.

A plurality of filters trained in each of the CNNs corresponding to each frequency band are applied to the input first spectrogram in operation S930.

The output values of each CNN to which the plurality of filters are applied are merged to acquire a second spectrogram in operation S940. At this time, the output values of each CNN may be merged to acquire a reconstructed current frame. According to an embodiment, a first spectrogram for each frequency band to which a plurality of filters are applied is input to a sigmoid gate, and a first spectrogram for each frequency band outputted from the sigmoid gate may be merged to acquire a second spectrogram. The second spectrogram may also be acquired by combining the phase component of the first spectrogram and the magnitude component compensated by the CNN.

The reconstructed audio signal is acquired based on the second spectrogram in operation S950. At this time, the second spectrogram may be inverse-transformed into an audio signal based on time and magnitude to acquire a reconstructed audio signal.

According to various embodiments as described above, even a sound source degraded due to compression can enable a user to enjoy a sound in a level of an original sound, and the waste of radio resources due to high bandwidth data transmission may be reduced. Accordingly, an audio device owned by a user may be fully utilized.

The controlling method according to the various embodiments described above can be implemented as a program and stored in various recording media. That is, a computer program that can be processed by various processors to execute the various controlling methods described above may be used in a state stored in a recording medium.

As an example, a non-transitory computer readable medium storing there in a program for performing the steps of acquiring a first spectrogram corresponding to a damaged audio signal, inputting a first spectrogram to a corresponding CNN for each frequency band, applying a plurality of filters trained in each of the CNN corresponding to each frequency band in the input first spectrogram, merging the output values of each CNN to which the plurality of filters are applied to acquire a second spectrogram, and acquiring the reconstructed audio signal based on the second spectrogram may be provided.

The non-transitory computer readable medium refers to a medium that stores data semi-permanently rather than storing data for a very short time, such as a register, a cache, a memory or etc., and is readable by an apparatus. The aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:

a storage configured to store a plurality of filters trained in a plurality of convolutional neural networks (CNNs) respectively; and a processor configured to:

acquire a first spectrogram corresponding to an audio signal, input each of a plurality of frequency bands of the first spectrogram to a corresponding one of the plurality of CNNs to apply the plurality of filters trained in the plurality of CNNs, acquire a second spectrogram by merging output values of the CNNs to which the plurality of filters are applied, and acquire an audio signal reconstructed based on the second spectrogram.

2. The electronic apparatus of claim 1, wherein:

the plurality of CNNs comprises a first CNN into which a first frequency band of the first spectrogram is input and a second CNN into which a second frequency band of the first spectrogram is input, the plurality of filters comprise a first filter and a second filter trained in the first CNN and a third filter and a fourth filter trained in the second CNN, the first filter and third filter are trained based on the first frequency band and the second filter and the fourth filter are trained based on the second frequency band, the processor is further configured to:

acquire a first portion of the second spectrogram corresponding to the first frequency band by merging output values of the first CNN to which the first filter is applied and output values of the second CNN to which the third filter is applied, and acquire a second portion of the second spectrogram corresponding to the second frequency band by merging output values of the first CNN to which the second filter is applied and output values of the second CNN to which the fourth filter is applied.

3. The electronic apparatus of claim 1, wherein the processor is further configured to:

identify the first spectrogram in a frame unit, group a current frame and a previous frame in a predetermined number to input the grouped frames to the CNN corresponding to each frequency band, and acquire a reconstructed current frame by merging output values of the CNNs respectively.

4. The electronic apparatus of claim 1, wherein the plurality of CNNs are included in a first CNN layer, wherein the processor is further configured to:

acquire the second spectrogram by inputting an output value of the first CNN layer to a second CNN layer comprising a plurality of other CNNs, and a size of a filter included in the second CNN layer is different from a size of a filter included in the first CNN layer.

5. The electronic apparatus of claim 1, wherein the processor is further configured to input the first spectrogram by the frequency bands to which the plurality of filters are applied to a sigmoid gate respectively, and acquire the second spectrogram by merging the first spectrogram by frequency bands output from the sigmoid gate.

6. The electronic apparatus of claim 1, further comprising:

an input, wherein the processor is further configured to:

transform the audio signal input through the input to the first spectrogram based on time and frequency, and acquire the reconstructed audio signal by inverse transforming the second spectrogram to an audio signal based on time and magnitude.

7. The electronic apparatus of claim 6, wherein the processor is further configured to acquire a compensated magnitude component by acquiring a magnitude component in the first spectrogram and inputting to corresponding CNNs by frequency bands and acquire the second spectrogram by combining a phase component of the first spectrogram and the compensated magnitude component.

8. The electronic apparatus of claim 1, wherein the processor is configured to input a frequency band which is greater than or equal to a predetermined magnitude, among frequency bands of the first spectrogram, to a corresponding CNN.

9. The electronic apparatus of claim 1, wherein the processor is further configured to normalize and input the first spectrogram to a corresponding CNN by frequency bands, denormalize the second spectrogram, and acquire the reconstructed audio signal based on the denormalized second spectrogram.

10. A method of controlling an electronic apparatus, the method comprising:

acquiring a first spectrogram corresponding to an audio signal;

inputting each of a plurality of frequency bands of the first spectrogram to a corresponding one of a plurality of CNNs;

applying a plurality of filters respectively trained in the CNNs to the frequency bands;

acquiring a second spectrogram by merging output values of the CNNs to which the plurality of filters are applied; and acquiring an audio signal reconstructed based on the second spectrogram.

11. The method of claim 10, wherein:

the plurality of CNNs comprises a first CNN into which a first frequency band of the first spectrogram of a first frequency band is input and a second CNN into which a second frequency band of the first spectrogram is input, the plurality of filters comprise a first filter and a second filter trained in the first CNN and a third filter and a fourth filter trained in the second CNN, the first filter and third filter are trained based on the first frequency band and the second filter and the fourth filter are trained based on the second frequency band, the acquiring the second spectrogram comprises acquiring a first portion of the second spectrogram corresponding to the first frequency band by merging output values of the first CNN to which the first filter is applied and output values of the second CNN to which the third filter is applied, and acquiring a second portion of the second spectrogram corresponding to the second frequency band by merging output values of the first CNN to which the second filter is applied and output values of the second CNN to which the fourth filter is applied.

12. The method of claim 10, wherein the inputting comprises identifying the first spectrogram in a frame unit, grouping a current frame and a previous frame in a predetermined number to input the grouped frames to the CNN corresponding to each frequency band, wherein the acquiring the second spectrogram comprises acquiring a reconstructed current frame by merging output values of the CNNs respectively.

13. The method of claim 10, wherein the plurality of CNNs are included in a first CNN layer, and wherein the acquiring the second spectrogram comprises acquiring the second spectrogram by inputting an output value of the first CNN layer to a second CNN layer comprising a plurality of other CNNs, and wherein a size of a filter included in the second CNN layer is different from a size of a filter included in the first CNN layer.

14. The method of claim 10, wherein the acquiring the second spectrogram comprises inputting first spectrogram by the frequency bands to which the plurality of filters are applied to a sigmoid gate respectively, and acquiring the second spectrogram by merging the first spectrogram by frequency bands output from the sigmoid gate.

15. A non-transitory computer readable medium having stored therein a computer instruction which, when executed by a processor of an electronic apparatus, causes the electronic device to perform operations comprising:

acquiring a first spectrogram corresponding to an audio signal;

inputting each of a plurality of frequency bands of the first spectrogram to a corresponding one of a plurality of convolutional neural networks (CNNs);

applying a plurality of filters respectively trained in the CNNs to the frequency bands;

acquiring a second spectrogram by merging output values of the CNNs to which the plurality of filters are applied; and acquiring an audio signal reconstructed based on the second spectrogram.

* * * * *